United States Patent Office 2,982,596
Patented May 2, 1961

2,982,596

N,N'-DIARYLNAPHTHOQUINONE-IMINES

Ernst Merian, Bottmingen, near Basel, Switzerland, assignor to Sandoz Ltd., Basel, Switzerland No Drawing. Filed Nov. 6, 1958, Ser. No. 772,157

Claims priority, application Switzerland Jan. 15, 1954

12 Claims. (Cl. 8—57)

The present invention is a continuation-in-part application to the co-pending application Ser. No. 480,998, filed on January 10, 1955, and relates to N,N'-diarylnaphthoquinone-imines, and particularly to a group of these compounds which draw onto acetate silk, and synthetic polyamide and polyester fibers in green shades and which yield dyeings which are distinguished by good to very good fastness to light, washing and sublimation and which, additionally, are dischargeable.

The aforesaid N,N'-diarylnaphthoquinone-imines of the present invention correspond to the formula

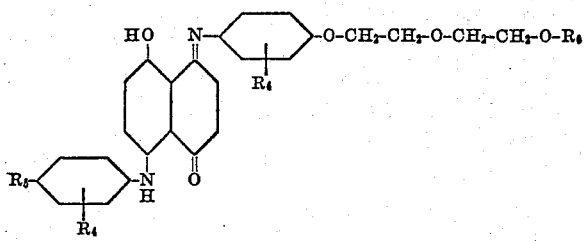

wherein $R_4$ is hydrogen, chlorine or bromine,
$R_5$ is hydrogen, lower alkoxy or

—O—CH$_2$—CH$_2$—O—CH$_2$—CH$_2$—O—R$_6$ and $R_6$ is hydrogen or lower alkyl.

The aforesaid dyestuffs according to the present invention are obtained by reacting one mol of the naphthazarine intermediate of the formula

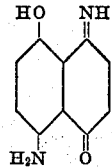

in the presence of a condensing agent with one mol of an arylamine of the formula

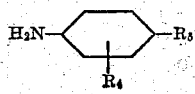

and one mol of an arylamine of the formula

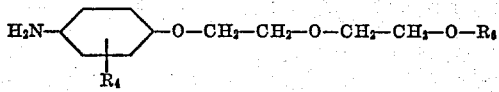

in which formulae $R_4$, $R_5$ and $R_6$ have the precedingly indicated significances.

The condensation can be carried out in the presence of an excess of the amine or amines to be condensed, and in such manner that only two mols of arylamine react with one mol of naphthazarine intermediate.

The naphthazarine intermediate, which in the literature is also designated as 5-amino-8-hydroxy-1,4-naphthoquinone-1-imine, can be prepared by known methods, for example, by treating 1,5-dinitronaphthalene with sulfur sesquioxide.

Illustrative of amines of the benzene series which are suitable, according to the present invention, for condensation with the naphthazarine intermediate are inter alia:

1-[2'-(2''-hydroxy)-ethoxy]-ethoxy-4-aminobenzene,
[2'-(2''-methoxy)-ethoxy]-ethoxy-4-aminobenzene,
[2'-(2''-ethoxy)-ethoxy]-ethoxy-4-aminobenzene,
[2'-(2''-propoxy)-ethoxy]-ethoxy-4-aminobenzene,
[2'-(2''-butoxy)-ethoxy]-ethoxy-4-aminobenzene,
1-[2'-(2''-methoxy)-ethoxy]-ethoxy-2-chloro-4-aminobenzene, and for one-sided condensation for instance also aniline and p-phenetidine.

Suitable condensing agents for the purpose of the present invention are preferably organic solvents such, for example, as ethyl alcohol, benzyl alcohol, glacial acetic acid, etc.

The reaction of the naphthazarine intermediate with the arylamine or arylamines is advantageously carried out at raised temperature and, if desired, in the presence of appropriate catalysts such for example as boric acid, sodium acetate, copper bronze, copper salts, etc.

The following examples set forth presently-preferred representative embodiments of the invention; these examples are intended to be illustrative and not at all limitative. The parts are parts by weight. Temperatures are in degrees centigrade.

Example 1

18.8 parts of naphthazarine intermediate are heated to boiling in 200 parts of glacial acetic acid. Thereupon, at 100–110°, 85 parts of 1-[2'-(2''-methoxy)-ethoxy]-ethoxy-4-aminobenzene are added to the resultant solution. The originally violet solution first turns blue and finally green. After heating for 7 hours, the solution is cooled and is then diluted with 500 parts of water. This results in the precipitation of the produced N,N'-di{4-[2' - (2'' - methoxy)-ethoxy]-ethoxy}-phenylnaphthoquinone-imine which corresponds to the formula

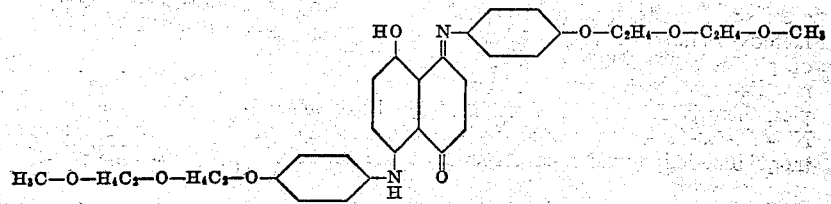

This compound can be recrystallized from ethanol and, in the pure state, melts at 111–112°. This new dyestuff dissolves with green coloration in ethyl alcohol and with bluish green coloration in concentrated sulfuric acid. Dispersed in the usual way in water, it dyes acetate silk and synthetic polyamide fibers in pure green shades of very good fastness to light, washing and sublimation. It is also suitable for dyeing synthetic polyester fibers, in which case it is advantageous to use raised pressure or to operate in the presence of carriers in the dyebath.

In contrast to this new dyestuff, the correspondingly prepared products from one mol of naphthazarine intermediate and two mols of aminobenzene or two mols of 1-hydroxy-4-amino-benzene, which contain no ether groups, have no affinity for acetate silk and synthetic polyamide fibers.

*Example 2*

63 parts of naphthazarine intermediate-zinc chloride double salt (obtained according to the data of PB 73377 Micro-films, frames 2226–2228) are reacted at 100° with 85 parts of 1-[2'-(2''-methoxy)-ethoxy]-ethoxy-4-aminobenzene in 300 parts of glacial acetic acid. At the end of 2½ hours the resultant solution has a full green color. The solution is filtered off from ethanol-insoluble residue, and the filtrate is poured onto 5000 parts of ice water. In a short time, the produced dyestuff separates out in filtrable form. It contains a trace of naphthazarine intermediate but is otherwise identical with the dyestuff obtained according to Example 1. Its green dyeings on acetate silk and synthetic polyamide fibers are very vivid; its dyeings on polyester fibers are slightly more yellow.

By proceeding after the manner set forth in Examples 1 and 2 an additional series of condensation products according to the present invention can be obtained from one mol of naphthazarine intermediate and two mols of the following amino compounds:

| Example No. (1) | Amino intermediate (2) | Color of the Dyestuff Solution in Ethanol (3) |
|---|---|---|
| 3 | 1-[2' - 2'' - ethoxy) - ethoxy] - ethoxy - 4 - aminobenzene. | green. |
| 4 | 1 - [2' - (2'' - butoxy) - ethoxy] - ethoxy - 4 - aminobenzene. | Do. |
| 5 | 1 - [2' - (2'' - hydroxy) - ethoxy] - ethoxy - 4 - aminobenzene. | Do. |
| 6 | 1 - [2' - (2'' - hydroxy) - ethoxy] - ethoxy - 2 - chloro-4-aminobenzene. | Do. |
| 7 | 1 - [2' - (2'' - methoxy) - ethoxy] - ethoxy - 2 - chloro-4-aminobenzene. | Do. |
| 8 | 1 - [2' - (2'' - methoxy) - ethoxy] - ethoxy - 2 - bromo-4-aminobenzene. | Do. |
| 9 | 1 - [2' - (2'' - ethoxy) - ethoxy] - ethoxy - 2 - chloro-4-aminobenzene. | Do. |

*Example 10*

30.8 parts of the mono-condensation product, obtainable according to U.S. Patent No. 2,066,119, from one part of naphthazarine intermediate and one part of 1-ethoxy-4-aminobenzene, and which dissolves in pure sulfuric acid with brown coloration and dyes acetate silk greenish blue, are condensed with 30 parts of 1-[2'-(2''-methoxy)-ethoxy]-ethoxy-4-aminobenzene in 200 parts of glacial acetic acid at 100°. After working up the reaction product in the manner of the preceding examples, there is obtained the dyestuff N-(4-ethoxy)-phenyl-N' - {4-[2'-(2''-methoxy)-ethoxy]-ethoxy}-phenyl-napthoquinone-imine, which corresponds to the formula

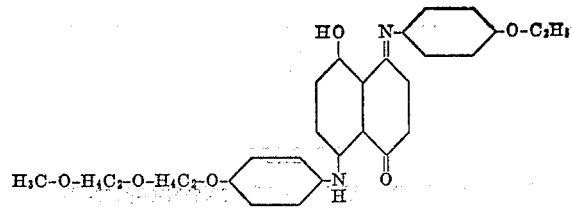

and which is soluble with blue-green coloration in pure sulfuric acid and dyes acetate silk in pure green shades.

In corresponding manner, the dyestuff N-phenyl-N'-{4 - [2 '- (2''-methoxy)-ethoxy]-ethoxy}-phenyl-naphthoquinone-imine, which corresponds to the formula

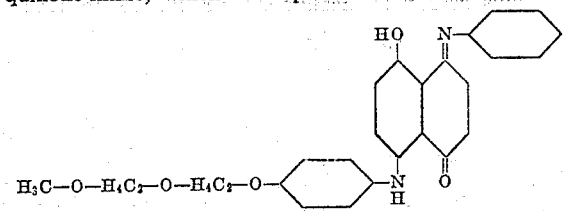

can be prepared from the mono-condensation product obtainable according to U.S. Patent No. 2,135,366 from equimolecular quantities of naphthazarine intermediate and aminobenzene.

*Example 11*

A dyebath is prepared from 0.6 part of the dyestuff prepared according to Example 1 and dispersed with the aid of Turkey-red oil, 6 parts of a fatty alcohol sulfonate and 3000 parts of water. 100 parts of acetate silk are introduced into the bath at room temperature (20–30°), and the bath then heated to 80° in the course of 1 hour and maintained at 80° for an additional hour. At the end of this time, the dyeing process is finished. The dyed material is withdrawn from the bath and is rinsed and dried. To enhance the dispersion, the dyestuff may be preliminarily ground with a suitable wetting agent, dispersing agent or emulsifier, preferably in the presence of an inorganic salt such as Glauber's salt. The dyestuff may also be intimately admixed in the form of an aqueous paste with a dispersing agent and, by suitable drying, converted into the form of a dyestuff powder.

Having thus disclosed the invention, what is claimed is:

1. N,N'-diarylnaphthoquinone-imine of the formula

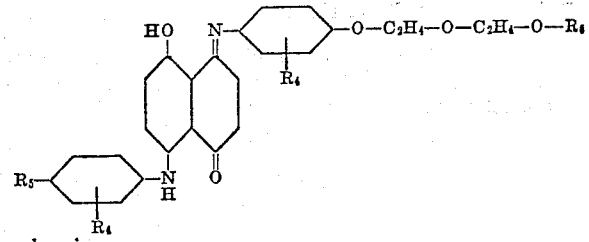

wherein
$R_4$ stands for a member selected from the class consisting of hydrogen, chlorine and bromine,
$R_5$ stands for a member selected from the class consisting of hydrogen, lower alkoxy and $-O-C_2H_4-O-C_2H_4-O-R_6$, and wherein
$R_6$ stands for a member selected from the class consisting of hydrogen and lower alkyl.

2. N,N'-diarylnaphthoquinone-imine of the formula

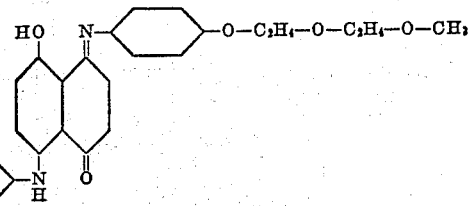

3. N,N'-diarylnaphthoquinone-imine of the formula

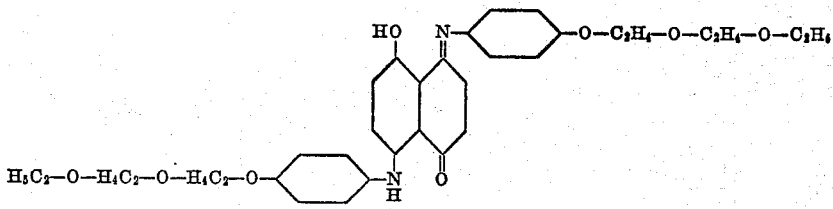

4. N,N'-diarylnaphthoquinone-imine of the formula

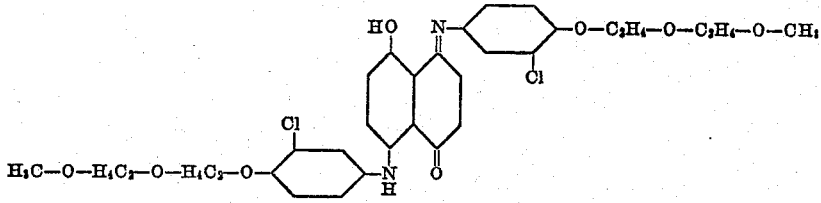

5. N,N'-diarylnaphthoquinone-imine of the formula

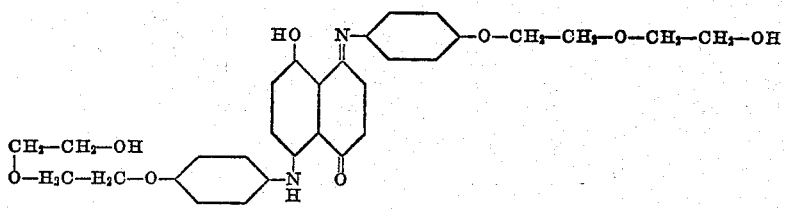

6. N,N'-diarylnaphthoquinone-imine of the formula

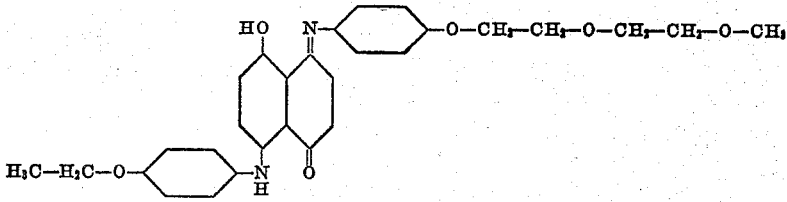

7. A method of dyeing acetate silk which comprises applying thereto an aqeous dispersion of a dyestuff according to claim 1.

8. A method of dyeing acetate silk which comprises applying thereto an aqueous dispersion of a dyestuff according to claim 2.

9. A method of dyeing acetate silk which comprises applying thereto an aqueous dispersion of a dyestuff according to claim 3.

10. A method of dyeing acetate silk which comprises applying thereto an aqueous dispersion of a dyestuff according to claim 4.

11. A method of dyeing acetate silk which comprises applying thereto an aqueous dispersion of a dyestuff according to claim 5.

12. A method of dyeing acetate silk which comprises applying thereto an aqueous dispersion of a dyestuff according to claim 6.

References Cited in the file of this patent

UNITED STATES PATENTS

| | | |
|---|---|---|
| 2,066,119 | Mettler | Dec. 29, 1936 |

FOREIGN PATENTS

| | | |
|---|---|---|
| 653,356 | Great Britain | May 16, 1951 |
| 784,156 | Great Britain | Oct. 2, 1957 |
| 988,181 | France | Apr. 25, 1951 |
| 267,690 | Switzerland | July 1, 1950 |